Dec. 16, 1924.
W. F. BUTLER
1,519,754
SPIRAL WINDER CUT-OFF MECHANISM
Original Filed Aug. 1, 1921    7 Sheets-Sheet 1

Fig-1

Inventor
William F. Butler
By Munday, Clarke & Carpenter
Attys

Dec. 16, 1924.

W. F. BUTLER 1,519,754

SPIRAL WINDER CUT-OFF MECHANISM

Original Filed Aug. 1, 1921     7 Sheets-Sheet 3

Inventor
William F. Butler
By:- Munday, Clarke & Carpenter
Attys

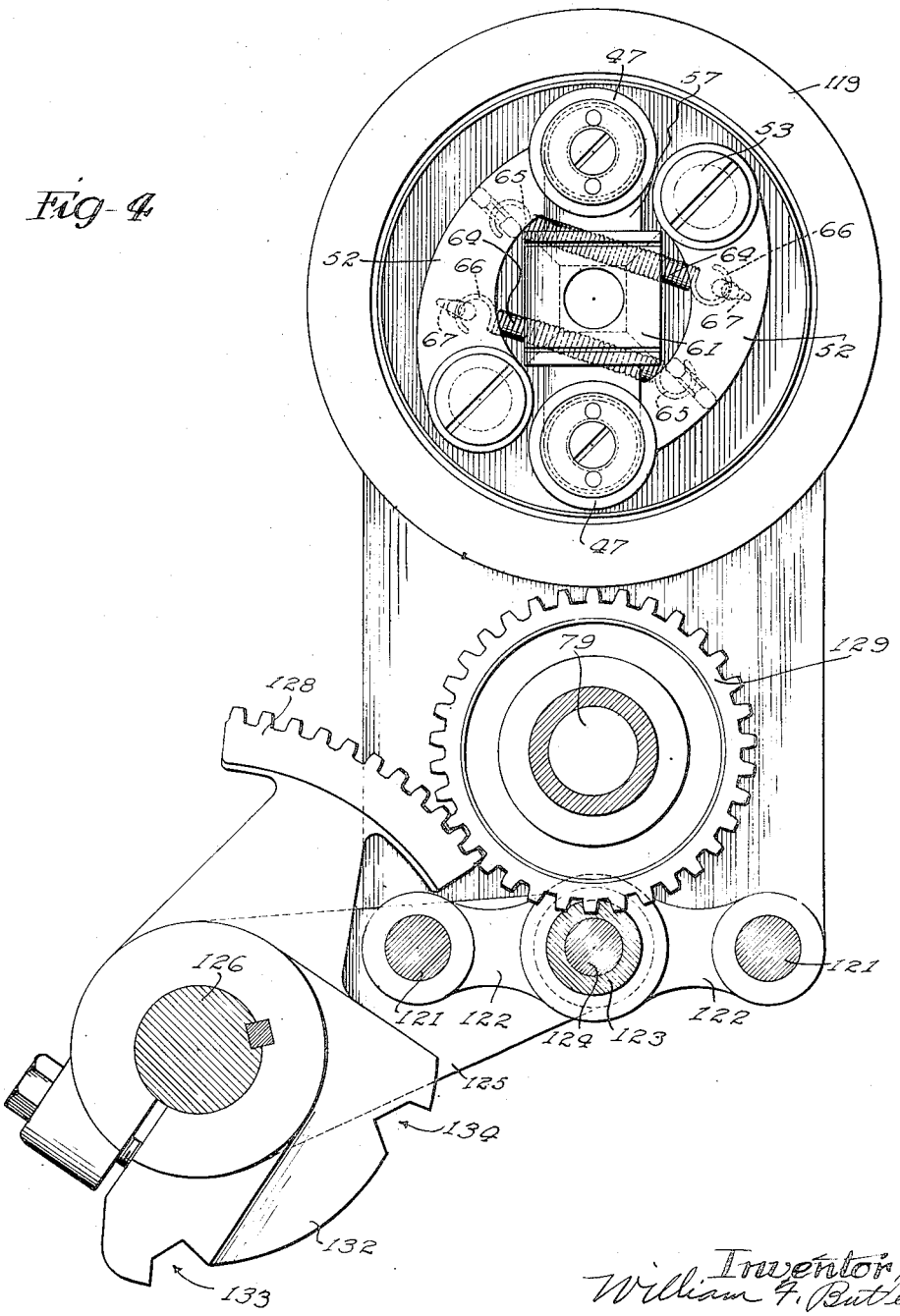

Dec. 16, 1924.
W. F. BUTLER
1,519,754
SPIRAL WINDER CUT-OFF MECHANISM
Original Filed Aug. 1, 1921   7 Sheets-Sheet 5
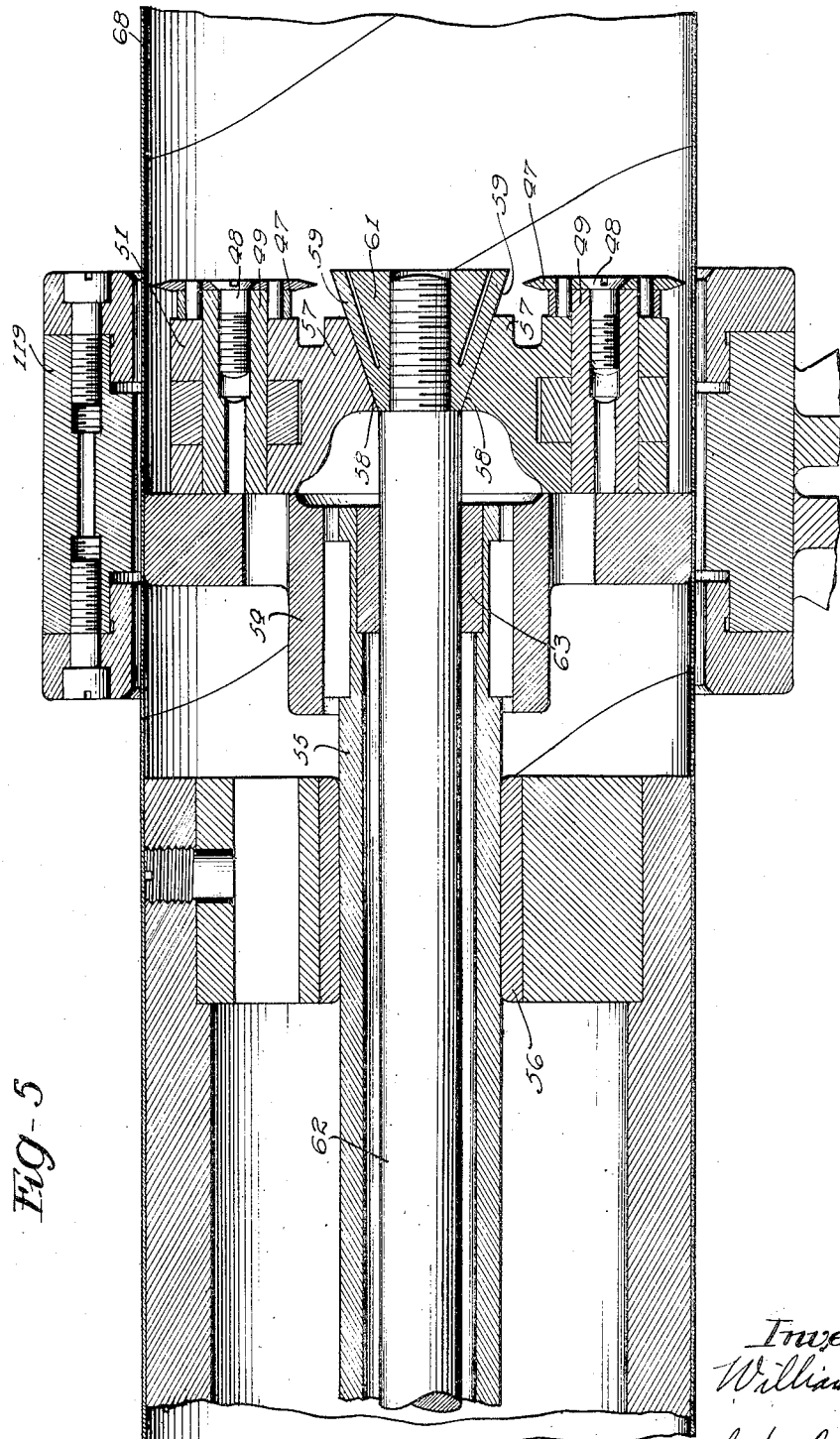

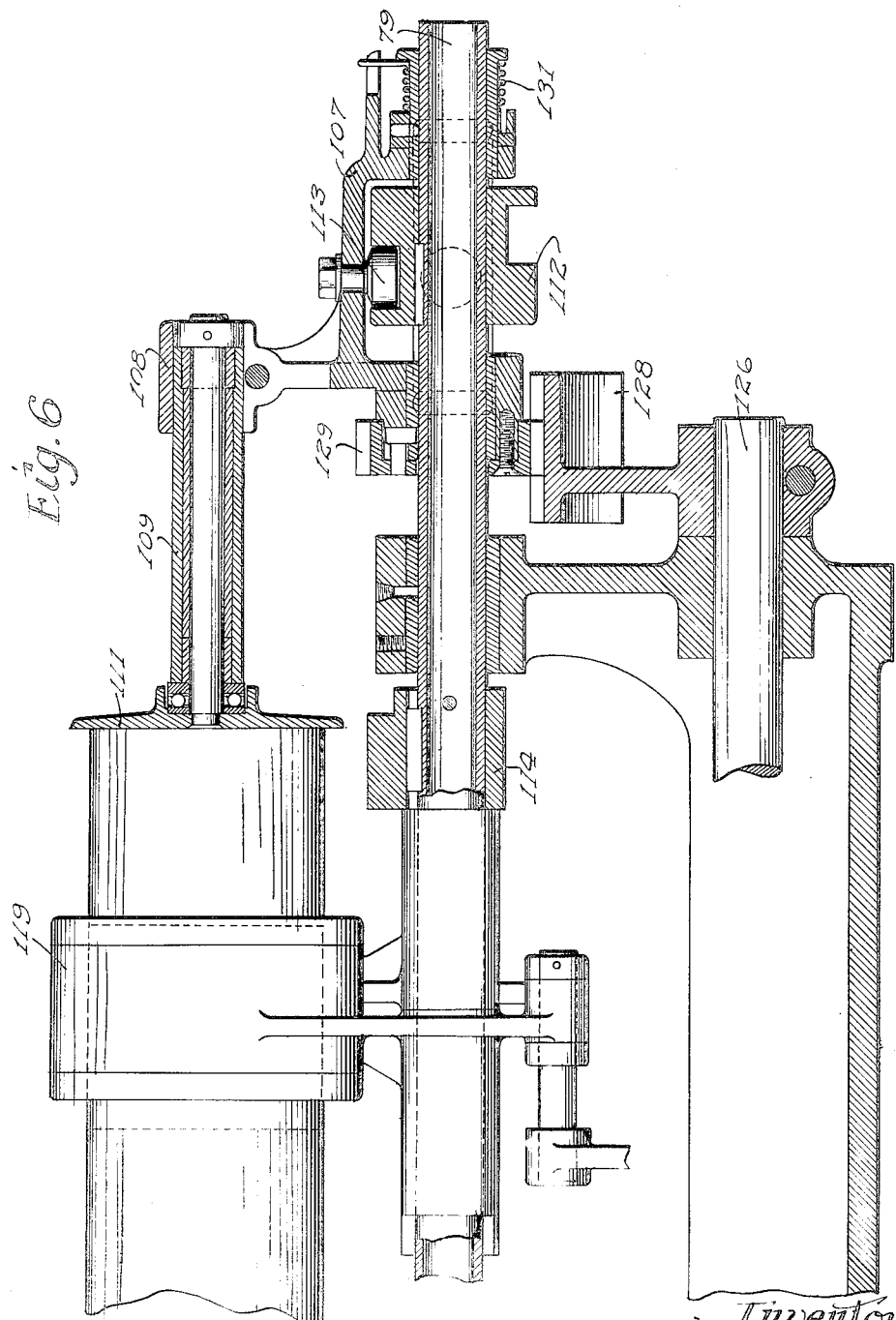

Dec. 16, 1924.
W. F. BUTLER
1,519,754
SPIRAL WINDER CUT-OFF MECHANISM
Original Filed Aug. 1, 1921  7 Sheets-Sheet 7
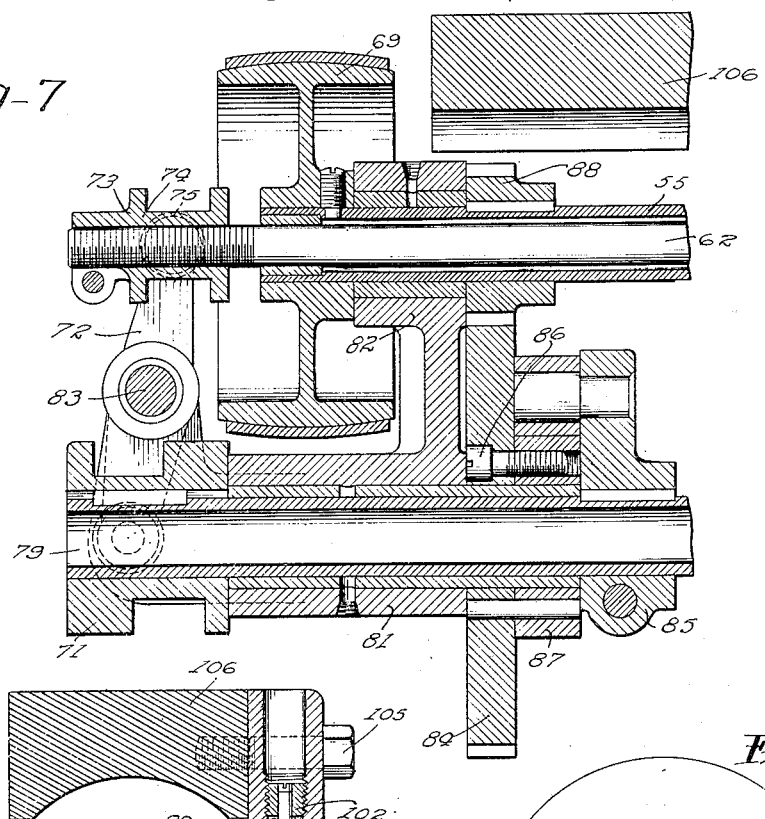

Patented Dec. 16, 1924.

1,519,754

UNITED STATES PATENT OFFICE.

WILLIAM F. BUTLER, OF HILLSIDE, NEW JERSEY, ASSIGNOR TO AMERICAN CAN COMPANY, OF NEW YORK, N. Y., A CORPORATION OF NEW JERSEY.

SPIRAL-WINDER CUT-OFF MECHANISM.

Application filed August 1, 1921, Serial No. 488,825. Renewed March 7, 1924.

*To all whom it may concern:*

Be it known that I, WILLIAM F. BUTLER, a citizen of the United States, residing in Hillside, in the county of Union and State of New Jersey, have invented a new and useful Improvement in Spiral-Winder Cut-Off Mechanism, of which the following is a specification.

My invention relates in general to machines for forming paper can bodies, especially of that type in which the body material is spirally wound and glued together, and has more particular reference to mechanism provided in such a machine for the purpose of cutting off bodies of desired length from a continuously produced tubing.

A principal object of the invention is the provision of a cut-off mechanism adapted to accommodate itself to any speed with which the tubing is produced and to cut off in each instance a body with a clean circular edge and of desired length.

A further object of the invention is the provision of cutting elements in a machine of this type adapted to move with the advancing tubing and to operate on the interior thereof with such accuracy and exactness as to prevent any irregularities or mangling in the cut edge.

A still further object of the invention is the provision in a mechanism of this character of means regulated by the advance of the tubing itself for actuating the cutting elements and for ejecting the severed can bodies at desired intervals.

Still another object of the invention is the provision of a mechanism for automatically restoring said last mentioned means after operation to position to be again actuated by the newly produced tubing.

Numerous other objects and advantages of the invention will be apparent as it is better understood from the following description, which, taken in connection with the accompanying drawings, discloses a preferred embodiment thereof.

Referring to the drawings;

Figure 1 is a side elevation of a spiral winding machine embodying the principles of my invention;

Fig. 4 is an enlarged section taken vertically through a portion of the rear end of the machine and showing the cutters in inoperative position;

Fig. 5 is an enlarged section taken centrally through a portion of the mandrel upon which the tubing is produced and through the cutting elements;

Fig. 6 is an enlarged elevational view of a portion of the rear end of the machine, certain parts being shown in longitudinal section for convenience of illustration;

Fig. 7 is an enlarged longitudinal section of a portion of the front end of the machine;

Fig. 8 is a vertical transverse section taken through the extreme front end of the machine;

Fig. 9 is an enlarged partial section taken through a portion of the front end of the machine looking toward the front.

Figure 2:
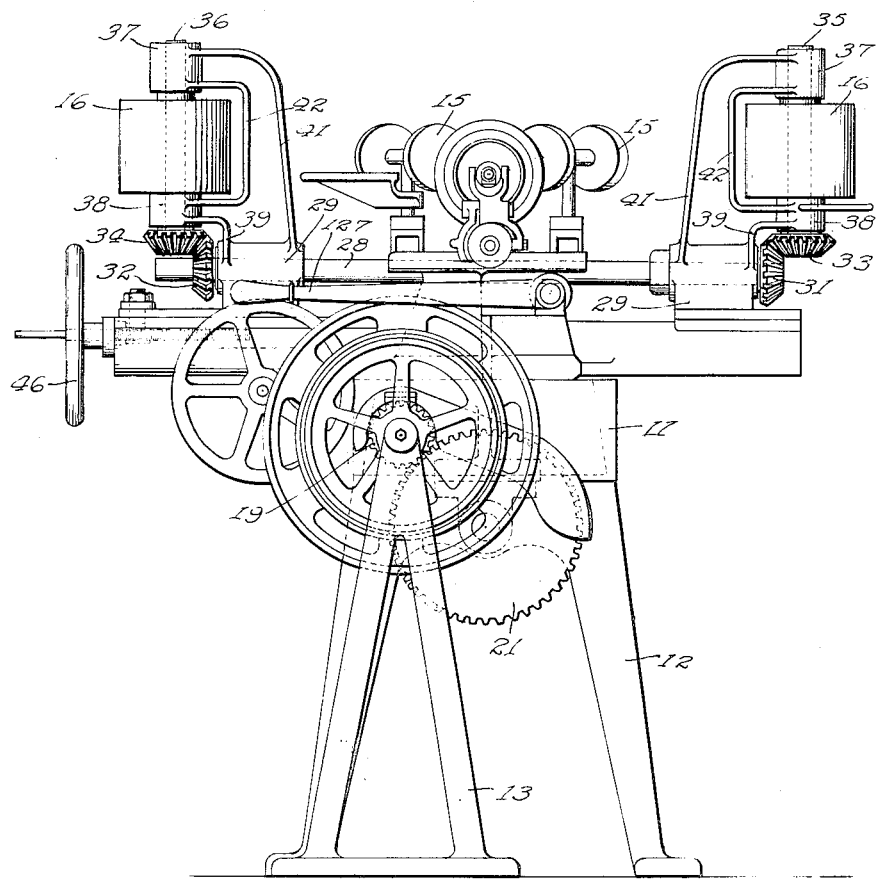
Fig. 2 is a front view of the machine showing particularly the power mechanism by which the winding is accomplished.
Figure 3:
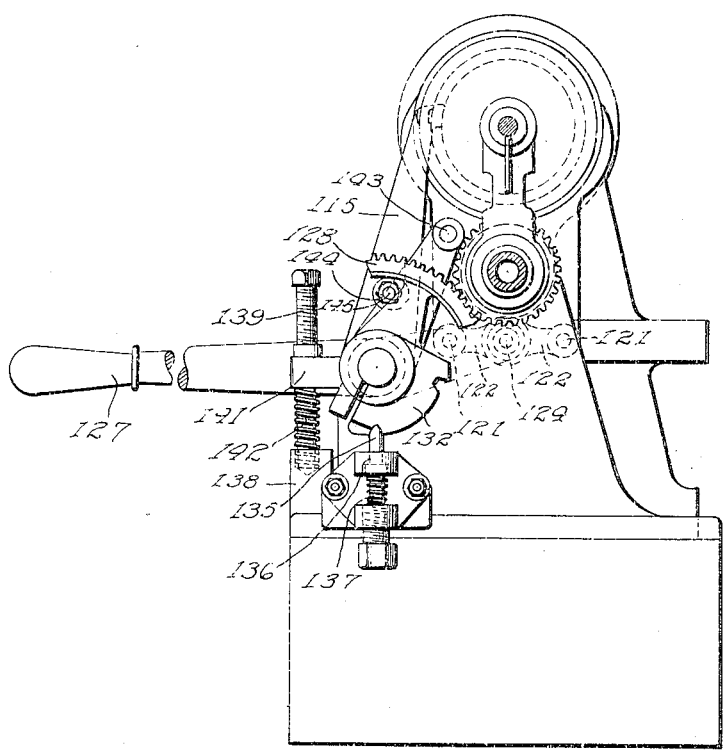
Fig. 3 is a rear view showing the relation of certain operative parts.

Upon the drawings which illustrate a preferred embodiment of the invention, the reference character 11 indicates the body frame upon which the machine is supported and the numerals 12 and 13 indicate the pedestal supports upon which said frame is sustained. A mandrel 14 constitutes the form and base upon which the body material is wound, and, in the present instance, said material is supplied from spools 15 arranged obliquely with reference to the mandrel to permit spiral winding. Belts, not shown, are guided around belt pulleys 16 and over the mandrel to provide pressure upon the paper strips as they are wound from the spools 15, it being understood that these strips have glue or other adhesive applied to suitable portions thereof and that the tube body is formed and the strips glued together by the action of these belts. This portion of the mechanism is operated by means of power applied to the pulley wheel 17 and transmitted through appropriate shafts and gearing to the pulleys 16. The pulley wheel 17 is carried on a shaft 18 which also has a pinion 19 mounted thereon and inwardly from the pulley. A gear 21 meshes with this pinion and is carried on a short shaft 22 having bearings in brackets 23 and 24 depending from the frame 11. A bevel pinion 25 mounted upon the opposite end of this shaft meshes with a bevel gear 26 which drives a vertical shaft 27, which in turn, by an appropriate connection rotates a transverse shaft 28 having bearings in brackets 29 on the frame, and carrying bevel pinions 31 and 32 at opposite ends. These pinions mesh with bevel gears 33 and 34, by means of which pulley shafts 35 and 36, supported in suitable bearings 37 and 38, are rotated. The bearings 37 and 38 are supported from the members 29 by means of rods 39 and 41 and guides 42 are provided adjacent the pulleys 16 to properly guide the belts. A clutch wheel 44 and a hand wheel 43 are provided on the shaft 18, and the angle and tension of the belt are controlled respectively by means of hand wheels 45 and 46 adjustably connected with the belt carrying members.

So much of the mechanism as has just been described is usual in a machine of this character, and forms no part of the present invention. I shall now describe the novel cut-off mechanism which I have provided for use with a winding machine of the foregoing general character.

Referring first to Figs. 4 and 5, it will be noted that the cutting elements comprise two oppositely disposed knives or cutters 47 which are secured by means of screws 48 to cut-off spindles 49 which in turn are rigidly secured in forked ends 51 of cut-off spindle levers 52. The opposite ends of these levers are secured by means of studs 53 to an inner chucking disk 54 which is keyed to a spindle 55 rotatably mounted in bearings 56 spaced at intervals within the mandrel. The ends of the levers 52 which carry the cutters are provided with depending flanges 57 which have beveled faces 58 which fit snugly against inclined faces 59 of a cut-off wedge 61. This wedge is secured to a wedge rod 62 which is supported for reciprocation in bearings 63 within the spindle 55. The flanges of the levers 52 are kept in contact with the wedge 61 by means of cut-off lever springs 64, each of which is secured at one end 65 to that end of the lever which carries the cutters 47, and at the opposite end 66 is hooked upon cut-off lever spring hooks 67. In normal inoperative position the cutters are held by the springs 64 out of contact with the paper tubing 68, and, by means of the wedge 61 they are kept from contact with the bolted end of the opposite lever. However, upon reciprocation of the wedge rod 62, which is accomplished in a manner to be hereinafter described, the knives are projected outwardly into cutting relation with the tubing, each of them being moved in an arcuate path about the bolted ends of the levers 52 and the entire mechanism being bodily rotated. Since the spindle 55 and the cutting elements secured thereto are moved longitudinally at the same rate as the advancing tubing and since by the use of a plurality of rigidly rotating knives the tubing may be cut very quickly it will be apparent that the mechanism which I provide not only permits successful accommodation of irregularities in the speed of producing the tubing, but also cuts a clean regular edge and eliminates any mutilation of the can body.

The spindle 55 is rotated by means of a pulley 69 and the wedge rod 62 has longitudinal reciprocal movement within the spindle, which movement is limited by a wedge cam 71 through the medium of a lever 72. Upon the front end of the rod 62 is a clamp collar 73 having a groove 74 for the reception of rollers 75 which are riveted to a fork 76 upon the lever 72. The lower end of this lever carries a roller 77 secured in place by means of a stud 78 and riding in the groove of the wedge cam 71, with the result that rotation of the cam member 71 will reciprocate the wedge rod longitudinally.

The cam member 71 is keyed to a cam shaft 79 which carries also a clutch-drive bearing 81 having an upper portion 82 which serves as a bearing for the spindle 55. The lever 72 is pivotally connected to the clutch-drive bearing by means of a pin 83 and it will be noted that this bearing serves as a rigid connection between the cam shaft 79 and the spindle 55 so that longitudinal movement of said cam shaft results in corresponding movement of the spindle 55 and the mechanism carried thereon.

The cam shaft 79 is rotated by means of a clutch gear 84 through the medium of a pawl lever 85. The gear 84 is loosely mounted upon the shaft 79 and has secured thereto, by means of a screw 86, a clutch ratchet gear 87, these members being rotated by means of a pinion 88 which is keyed to and revolves with the spindle 55. The pawl lever 85 is keyed to the cam shaft and has a clutch pawl 89 secured thereto by means of a clutch pawl pin 91. The lower portion 92 of the clutch pawl lever is provided with a stop shoulder 93 and has a clutch stop pin 94 extending therethrough, this pin being flattened at one end to permit the clutch pawl 89 to rest thereon and on said shoulder. The clutch pawl 89 and the clutch pawl lever 85 are provided with opposed recesses 95 and 96 for the reception of a clutch pawl spring 97 exerting constant stress upon the rear end of the clutch pawl 89. It will be observed that through this arrangement rotary movement is imparted to the cam shaft 79 through the medium of the pawl lever 85 when the ratchet gear 87 is engaged by the pawl 89.

In the idle position of the mechanism the pawl 89 is kept out of engagement with the ratchet gear 87 by means of a clutch safety pin 101 which slides in a screw 102 against the tension of a spring 103, these parts being positioned within a clutch safety bracket 104 which is secured by means of screws 105 to the mandrel bracket 106.

The cam shaft 79 has mounted on its rear end a bracket 107 provided with a bearing 108 which has adjustably secured therein a sleeve 109, to the forward end of which is secured a target disk 111. As the tubing is produced upon the mandrel 14 and projected therebeyond, it comes in contact with the disk 111 forcing the latter rearwardly and bodily moving the cam shaft 79 and the mechanism carried thereon. This results in corresponding movement of the spindle 55 which causes the cutting elements to be advanced with the tubing. At the same time the pawl 89 is disengaged from the safety pin 101 and engaged by one of the teeth of the ratchet gear 87, thus setting the cam shaft 79 to rotating. This results in reciprocation of the wedge rod 62 through the medium of the lever 72 and the action of the roller 77 in the wedge cam 71, and in this manner the rotary cutters 47 are projected by means of the action of the wedge 61 on the flanges 57 of the cut-off levers 52 into cutting relation with the projected tubing. A target cam 112 is keyed to the cam shaft 79 near its rear end and acts upon a roller 113 secured in the bracket 107, thereby moving said bracket and the target 111 secured thereto alternately toward and away from the end of the mandrel 14, so that it may always be in position to yieldingly resist the oncoming tubing. A knockout cam 114 is secured to the shaft 79 forwardly of the cam 112 and serves to actuate a knockout lever 115 at predetermined intervals to knock out the severed can bodies. A return cam 116 is also positioned upon the shaft 79 forwardly of the knockout cam and is adapted to act upon a stationary roller 117 secured in the cam shaft bearing 118, to return the shaft to its inoperative position after performance of the foregoing operations. The target disk 111 is then in position to receive a fresh attack of the oncoming tubing and the various operations hereinbefore described are repeated after a predetermined advance of said tubing.

It will be observed that the cutting elements are positioned within wings 119 beyond the end of the mandrel 14. These wings are mounted on the shaft 79 and on the lower jaw of each wing is a flange fastened by means of a stud 121 to a wing link 122. These links fit opposite each other in the center beneath the cam shaft 79 and are secured by means of bushings 123 and a stud 124 forming a toggle. A toggle lever 125 is riveted to the forward end of the stud 124 and its opposite end is mounted upon and keyed to a handle shaft 126. Release levers 127 are provided on the forward and rear ends of this handle shaft, the shaft itself being mounted in the cam shaft bearing 118. Secured upon the handle shaft near its rear end is a gear segment 128 which meshes with a gear 129 rotatably mounted on the shaft 79. Said gear 129 is secured to the target bracket 107 in such manner that the pressing down of the handle 127 results in longitudinal movement of this bracket to the right thereby throwing the target disk 111 out of obstructing position when desired. It may be held from return movement by the obstruction of the projected tubing and when the latter is cut and removed the bracket is returned to normal by means of a spring 131. Operation of the handles 127 also accomplishes the opening of the wings 119 for the purpose of permitting adjustments or making repairs in case of necessity, this opening movement being accomplished through the instrumentality of the toggle lever 125 and the links 122 heretofore described.

The gear segment 128 is provided with a lower protruding flange 132 in which are two notches 133 and 134. A release stop pin 135, held in a bracket 136 and under the tension of a spring 137, is adapted to be projected into one or the other of these notches to hold the release mechanism in either open or closed position.

A projection 138 is provided upon the cam shaft bearing member 118 and has a drilled hole therein for the reception of a knockout spring adjusting screw 139. This screw extends through the protruding flange of a knockout roller lever 141 which is constantly under the tension of a spring 142 jacketed on the lower part of the screw 139. This lever is mounted on the handle shaft 126 and has secured thereto a knockout roller 143 which is held against the knockout cam 114 by the tension of the spring 142. The lever 141 is provided with an oval shaped opening 144 corresponding to a similar opening in the adjacent knockout lever 115, and so connected by means of a bolt 145 that the movement imparted to the lever 141 by means of the cam 114 results in sudden sharp push motion of the knockout lever 115. It will be noted that the lever 115 is mounted on the handle shaft 126 and held in place by means of a collar 146 and that through intermittent actuation by the lever 141 an effective ejector for the severed can bodies is provided.

It will be observed that the return cam 116 is provided with a spring pin 147 in the left part thereof which is under pressure of a spring 148 and serves to keep the roller 117 normally in contact with the straight edge of the cam, thereby preventing accidental movement of the cam shaft in its idle position through vibration or slipping.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for forming fibre can bodies and the like, comprising a mandrel, mechanism for winding fibre strips on said mandrel to produce a tubing of the body form desired, and means operating inside said tubing and operable through the movement thereof for cutting off the tubing beyond said mandrel into predetermined lengths.

2. A machine for forming fibre can bodies and the like, comprising a mandrel, mechanism for winding fibre strips on said mandrel to produce a tubing of the body form desired, and rotary means operating inside said tubing and operable through the movement thereof for cutting off the tubing beyond said mandrel into predetermined lengths.

3. A machine for forming fibre can bodies and the like, comprising a mandrel, mechanism for winding fibre strips on said mandrel to produce a tubing of the body form desired, and means comprising rotary outwardly projectable blades operating inside said tubing for cutting the latter into predetermined sections.

4. A machine for forming fibre can bodies and the like, comprising a mandrel, mechanism for winding fibre strips on said mandrel to produce a tubing of the body form desired, and means comprising rotary blades positioned beyond said mandrel and interiorly of the advancing tubing for cutting said tubing into predetermined lengths, said blades being outwardly projectable into operable position by the force of the advancing formed tubing.

5. A machine for forming fibre can bodies and the like, comprising a mandrel, mechanism for forming fibre tubing on said mandrel and means for cutting the formed tubing into predetermined sections, said means comprising cutting elements normally positioned within the produced tubing and outwardly projectable into cutting relation with the tubing when the latter is advanced a predetermined distance beyond said mandrel.

6. A machine for forming fibre can bodies and the like, comprising a mandrel, mechanism for forming fibre tubing on said mandrel and means for cutting the formed tubing into predetermined sections, said means comprising a plurality of blades mounted to rotate beyond the mandrel, and means to project said blades into cutting relation with the tubing when the latter is advanced a predetermined distance beyond said mandrel.

7. A machine for forming fibre can bodies and the like, comprising a mandrel, mechanism for forming fibre tubing on said mandrel and means for cutting the formed tubing into predetermined sections, said means comprising pivoted cutting members positioned beyond the mandrel, means yieldingly resisting the advance of the formed tubing and members oscillated by movement of said tubing and projecting said cutting members into operative position when the tubing has completed a predetermined advance.

8. A machine for forming fibre can bodies and the like, comprising a mandrel, mechanism for forming fibre tubing on said mandrel and means for cutting the formed tubing into predetermined sections, said means comprising a plurality of pivoted cutting members positioned within the advancing tubing, means for rotating said cutting members and a longitudinally moving member intermittently reciprocated by the advancing tubing to project said cutting members into cutting relation with said tubing.

9. A machine for forming fibre can bodies and the like, comprising a mandrel, mechanism for forming fibre tubing on said mandrel and means for cutting the formed tubing into predetermined sections, said means comprising a plurality of cutters positioned beyond said mandrel and within the advancing tubing, a rotatable member upon which said cutters are pivotally mounted, a longitudinally oscillating wedge member extending within the mounting of said cutters and means for oscillating said wedge member to project said cutters into cutting relation with said tubing when the latter has completed a predetermined advance.

10. A machine for forming fibre can bodies and the like, comprising a mandrel, mechanism for forming fibre tubing on said mandrel and means for cutting the formed tubing into predetermined sections, said means comprising a plurality of cutting elements positioned beyond said mandrel and within the advancing tubing, a rotatable member upon which said cutting elements are pivotally mounted, flanged pivotal members carrying said cutting elements, a longitudinally oscillating wedge member extending between the flanges of said pivotal supporting member, and means controlled by the tubing for oscillating said wedge member intermittently to project the cutting elements into cutting relation with the produced tubing.

11. A machine for forming fibre can bodies and the like, comprising a mandrel, mechanism for forming fibre tubing on said mandrel and means for cutting the formed tubing into predetermined sections, said means comprising a plurality of cutting elements positioned beyond said mandrel and within the advancing tubing, a rotatable member upon which said cutting elements are pivotally mounted, flanged pivotal members carrying said cutting elements, a longitudinally oscillating wedge member extending between the flanges of said pivotal supporting member, and cam operated means controlled by the tubing for oscillating said wedge member intermittently to arcuately project the cutting elements into cutting relation with the produced tubing.

12. A machine for forming fibre can bodies and the like, comprising winding mechanism for producing tubing of the body form desired and cut-off mechanism for severing said tubing into predetermined sections, said cut-off mechanism comprising interior rotary cutting elements movable with and at the speed of the produced tubing and projectable into cutting position upon a predetermined advance thereof.

13. A machine for forming fibre can bodies and the like, comprising winding mechanism for producing tubing of the body form desired, cut-off mechanism comprising interior outwardly projectable cutters for severing said tubing into predetermined sections and means intermittently operable by the advancing tubing for ejecting the severed sections.

14. A machine for forming fibre can bodies and the like, comprising winding mechanism for producing tubing of the body form desired, cut-off mechanism comprising interior outwardly projectable cutters for severing said tubing into predetermined sections, a cam shaft movable longitudinally by the produced tubing and rotatable when so moved, a cam on said shaft, and means operable by said cam for projecting said cutters upon rotation of said shaft.

15. A machine for forming fibre can bodies and the like, comprising winding mechanism for producing tubing of the body form desired, cut-off mechanism comprising interior outwardly projectable cutters for severing said tubing into predetermined sections, a target member yieldingly opposing the produced tubing, a cam shaft upon which said target member is mounted and which is movable thereby, means for rotating said shaft upon movement thereof by said member, and a cam on said shaft for moving said target member alternately toward and away from the produced tubing.

16. A machine for forming fibre can bodies and the like, comprising winding mechanism for producing tubing of the body form desired, cut-off mechanism comprising interior outwardly projectable cutters for severing said tubing into predetermined sections, a target member yieldingly opposing the produced tubing, a cam shaft upon which said target member is mounted and which is movable thereby, means for rotating said shaft upon movement thereof by said member, and cam members for returning said shaft to normal stationary position after completion of a cutting operation.

17. A machine for forming fibre can bodies and the like, comprising winding mechanism for producing tubing of the body form desired, cut-off mechanism comprising interior outwardly projectable cutters for severing said tubing into predetermined sections, and means for releasing said mechanism from operative position and exposing said cutters for adjustment or repair.

18. A machine for forming fibre can bodies and the like, comprising a mandrel, mechanism for forming and advancing body tubing on said mandrel, interior rotatable cutters for severing said tubing into predetermined sections, pivoted members carrying said cutters and means comprising a reciprocating wedge member with which said pivoted members are yieldingly held in contact for intermittently projecting said cutters.

19. A machine for forming fibre can bodies and the like, comprising winding mechanism for producing and advancing body tubing, cutters positioned to operate upon the formed tubing, a rotary member upon which said cutters are pivotally mounted, an operation-control member geared to said rotary member and rotatable thereby upon completion of a predetermined advance of said tubing to project said cutters into operative position.

20. A machine for forming fibre can bodies and the like, comprising winding mechanism for producing and advancing body tubing, cutters positioned to operate upon the formed tubing, a rotary member upon which said cutters are pivotally mounted, an operation-control member geared to said rotary member and rotatable thereby upon completion of a predetermined advance of said tubing to project said cutters into operative position, and thereafter to restore the cutting mechanism to position for a succeeding operation.

WILLIAM F. BUTLER.